United States Patent [19]

Takei

[11] Patent Number: 5,789,892
[45] Date of Patent: Aug. 4, 1998

[54] XY DRIVE APPARATUS EQUIPPED WITH A LINEAR ELECTROMAGNETIC ACTUATOR

[75] Inventor: Seiji Takei, Kanagawa, Japan

[73] Assignee: Nippon Thompson Co., Ltd., Tokyo, Japan

[21] Appl. No.: 767,037

[22] Filed: Dec. 12, 1996

Related U.S. Application Data

[63] Continuation of Ser. No. 393,078, Feb. 23, 1995, abandoned.

[30] Foreign Application Priority Data

Feb. 23, 1994 [JP] Japan ................... 6-051421

[51] Int. Cl.⁶ ............................................ G05B 11/00
[52] U.S. Cl. ........................................ 318/687; 318/135
[58] Field of Search ............................... 318/687, 135

[56] References Cited

U.S. PATENT DOCUMENTS

| | | | |
|---|---|---|---|
| 3,940,676 | 2/1976 | Dudley | 318/687 X |
| 4,628,238 | 12/1986 | Smulders et al. | 318/687 X |
| 4,667,139 | 5/1987 | Hirai et al. | 318/687 |
| 4,698,575 | 10/1987 | Bouwer | 318/687 X |
| 4,714,400 | 12/1987 | Barnett et al. | 318/687 X |
| 4,774,442 | 9/1988 | Teramachi | 318/135 |
| 5,126,648 | 6/1992 | Jacobs | 318/640 |
| 5,160,877 | 11/1992 | Fujiwara et al. | 318/687 |
| 5,350,983 | 9/1994 | Miller et al. | 318/254 |

Primary Examiner—Brian Sircus
Attorney, Agent, or Firm—Sughrue, Mion, Zinn, Macpeak & Seas, PLLC

[57] ABSTRACT

An XY drive apparatus is described that is thin and enables the performing of both high-precision and high-speed work. The above advantages are achieved by using flat linear electromagnetic actuators for the driving source that perform high-speed work. In addition, these linear electromagnetic actuators are arranged on both sides of the apparatus, thereby preventing deviations in operation between both sides to achieve highly accurate positioning.

1 Claim, 10 Drawing Sheets

1

XY DRIVE APPARATUS EQUIPPED WITH A LINEAR ELECTROMAGNETIC ACTUATOR

This is a Continuation of application Ser. No. 08/393,078, filed Feb. 23,1995, now abandoned.

BACKGROUND OF THE INVENTION

1. Field of the Invention

The present invention relates to an XY drive apparatus that carries objects such as a workpiece and moves it two-dimensionally.

2. Description of the Prior Art

FIG. 1 indicates an XY drive apparatus of the prior art. Furthermore, this XY drive apparatus is disclosed in Japanese Laid-Open Patent Publication No. 2-116442.

As shown in the drawing, said apparatus respectively has relative moving members in the form of bed 1 and moving table 2. In this case, however, bed 1 is taken to be the stationary side and moving table 2, located above said bed 1, operates as the moving side. Moving table 2 is guided by a guiding device having the constitution described below, and freely moves two-dimensionally with respect to bed 1.

Namely, two track rails 4 are fixed in parallel on the upper surface of bed 1. Another two track rails 5 are attached in parallel on the lower surface of moving table 2 so as to transverse said track rails 4. Sliders 7 are respectively arranged between the mutual intersecting portions of these upper and lower track rails 4 and 5. Each of said sliders 7 is engaged to slide freely relative to each of both track rails 4 and 5. As a result of having said constitution, moving table 2 freely moves two-dimensionally in the X and Y directions.

Next, the following provides an explanation of the driving device that drives the above-mentioned moving table 2.

As shown in the drawing, motors (rotating type) 11 and 12 are mounted on bed 1 and moving table 2 via brackets 11a and 12a so that the central axis of rotation of each coincides with the above-mentioned X and Y directions. Each of said motors contains an internal ball nut (not shown) so that it integrally rotates with its rotor core (not shown), and are provided with threaded shafts 14 and 15, respectively, that screw onto these ball nuts. One end of each of said threaded shafts 14 and 15 is coupled to the above-mentioned sliders 7 via coupling plates 17 and 18. As a result of the driving device being composed in this manner, in this constitution, moving table 2 operates by each of motors 11 and 12 suitably rotating.

Recently, XY drive apparatuses have been required to be smaller in size, and particularly thinner, for the purpose of reducing the size of machine tools and so forth in which said XY drive apparatuses are incorporated. However, in the XY drive apparatus of the prior art described above, the space occupied by motors 11 and 12 as well as brackets 11a and 12a, which are provided for mounting these motors, is large in the direction of height of the apparatus, thus making it difficult to make the apparatus thinner.

In addition, in the driving constitution of the XY drive apparatus described above, there is the risk of the occurrence of deviation in the mutual moving distance of sliders 7 positioned on both sides of screw shafts 14 and 15 so as to sandwich them in between due to the effects of sliding resistance and so forth. In this case, there is the risk of the apparatus not being able to achieve high-precision positioning due to twisting of moving table 2. Incidentally, although the XY drive apparatus of the present example applies driving force by threaded shafts 14 and 15 to the central portion of coupling plates by erecting said coupling plates between two sliders 7, as is also disclosed in the above-mentioned publication, there is also an apparatus wherein a threaded shaft is coupled in the vicinity of the slider on one side, namely at a biased position. In this case, said twisting is considered to be considerably large.

Moreover, although it has recently been desirable to increase the speed of operation of XY drive apparatuses in order to improve work efficiency, in the case of using a ball screw in the manner described above, even if the speed of motors 11 and 12 is attempted to be increased, the operating speed of moving table 2 does not increase that significantly. Thus, it is not always easy to achieve greater speed.

SUMMARY OF THE INVENTION

In consideration of the above-mentioned points, the object of the present invention is to provide an XY drive apparatus that is thin and achieves increased accuracy and increased speed of operation.

The XY drive apparatus according to the present invention is equipped with a pair of relative moving members, a guiding device that guides both said relative moving members to freely move relatively two-dimensionally, and a driving device that relatively drives each of said relative moving members; said guiding device having a plurality of sets of first track rails fixed mutually in parallel to either one of each of said relative moving members, with one set consisting of at least one track rail, a plurality of sets of second track rails mutually arranged in parallel so as to transverse said first track rail and fixed to the other relative moving member of said pair of relative moving members, with one set consisting of at least one track rail, and a plurality of sliders arranged between the mutually intersecting portions of said first track rails and said second track rails, and able to freely perform relative motion with respect to said first track rails and said second track rails; and, said driving device being composed of a plurality of linear electromagnetic actuators provided individually corresponding to each set of said first track rails and said second track rails.

DESCRIPTION OF THE PREFERRED EMBODIMENTS

The following provides an explanation of an XY drive apparatus as an embodiment of the present invention with reference to the attached drawings.

Figure 1:
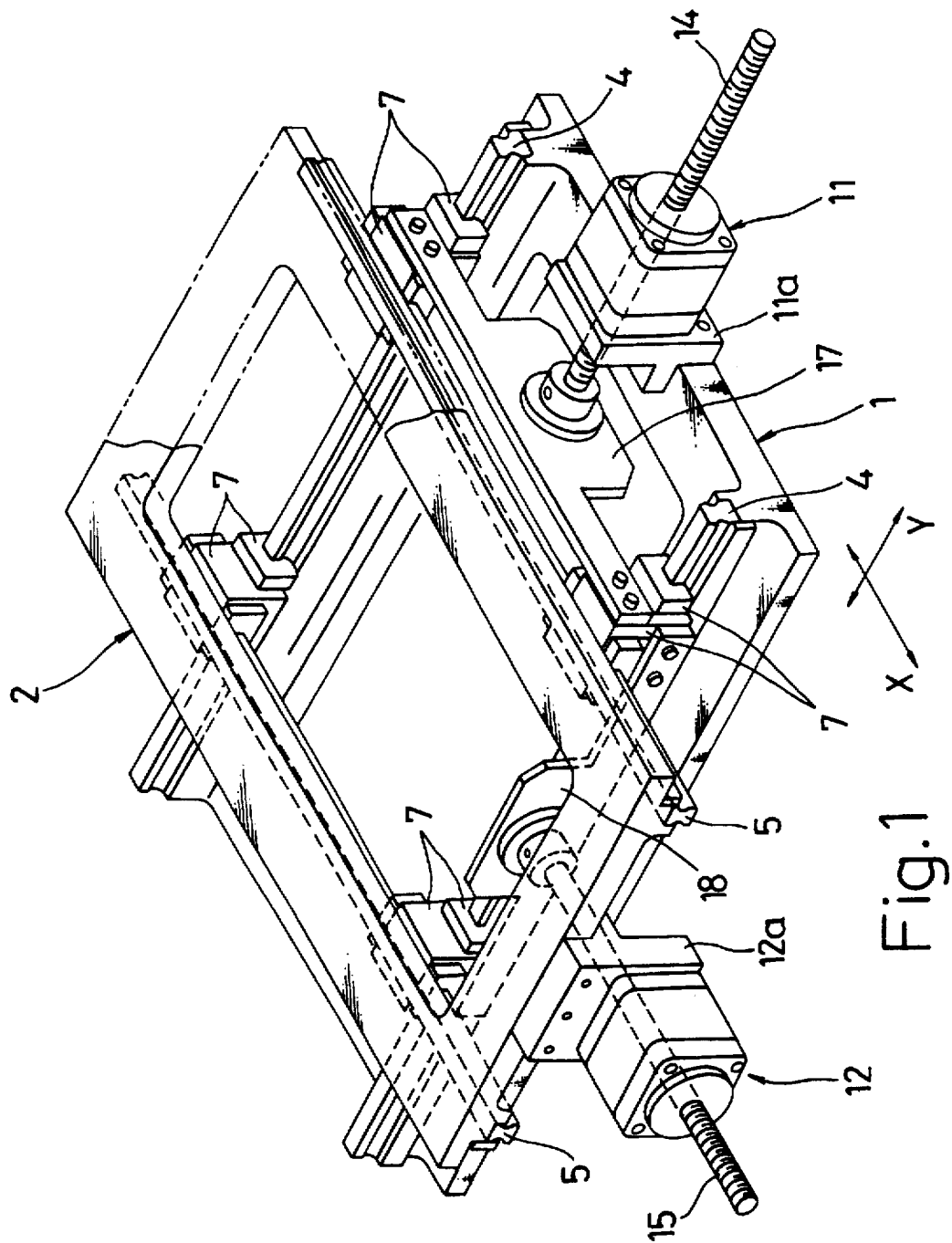
FIG. 1 is a perspective view, including a partial cross-section, of an XY drive apparatus of the prior art.
Figure 2:
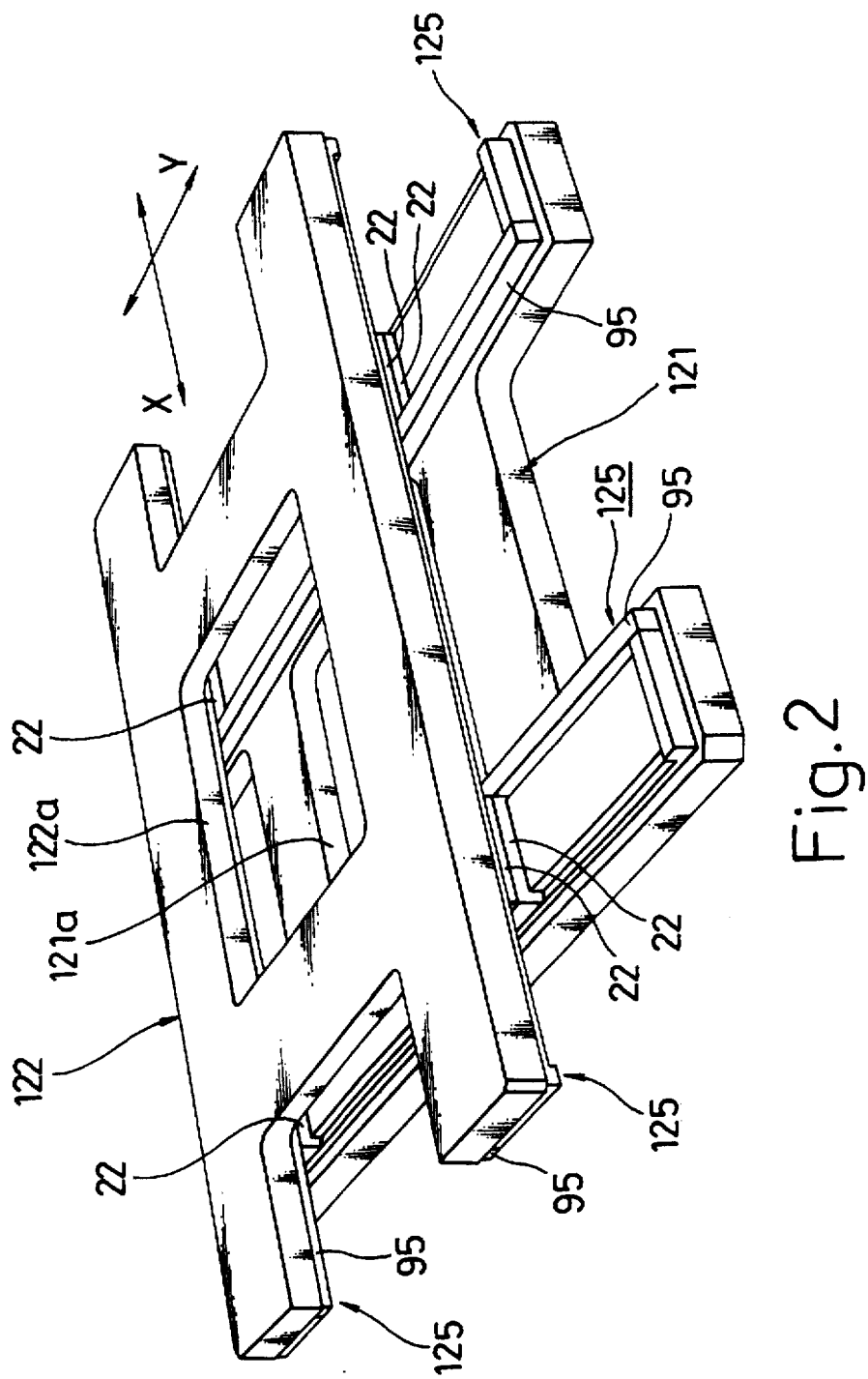
FIG. 2 is a perspective view of an XY drive apparatus as an embodiment of the present invention.
Figure 3:
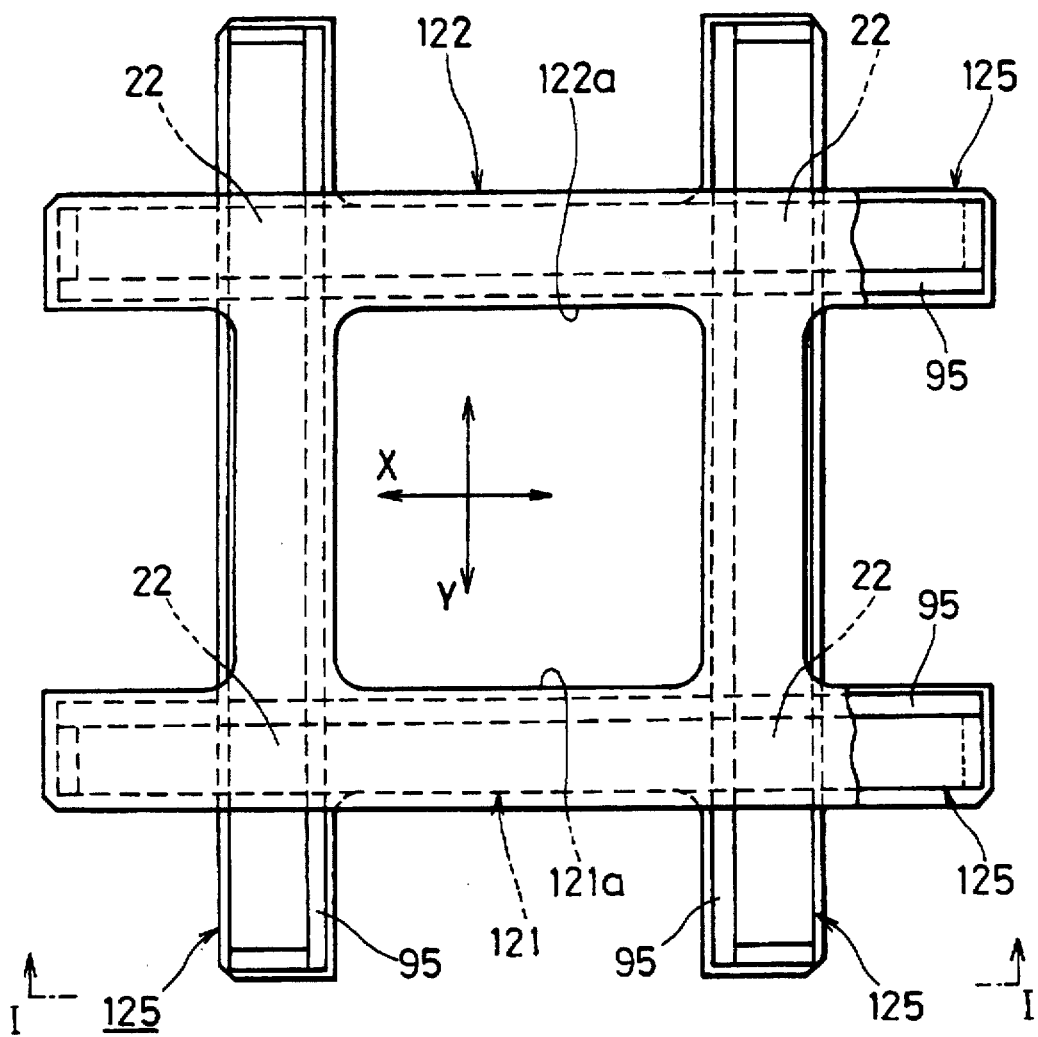
FIG. 3 is an overhead view, including a partial cross-section, of the XY drive apparatus shown in FIG. 2.
Figure 4:
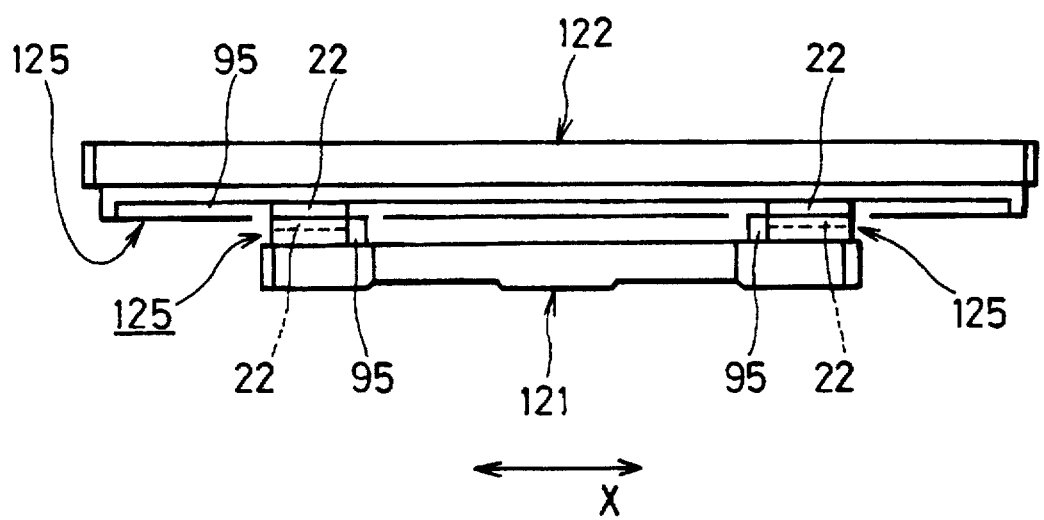
FIG. 4 is a front view of the XY apparatus as viewed along arrows I—I relating to FIG. 3.

As shown in FIGS. 2 through 4, said XY drive apparatus has respective relative moving members in the form of bed 121 and moving table 122. Bed 121 is arranged below as the stationary side, while moving table 122 is arranged above said bed 121 and operates as the moving side. Bed 121 and moving table 122 are mutually nearly of the same shape and dimensions, and their overall shape is roughly that of a flat plate with rectangular openings 121a and 122a formed in their centers.

Two lengthwise drive units 125, having the same constitution, are fixed mutually in parallel on the upper surface of the above-mentioned bed 121. However, both of said drive units 125 are respectively facing upward. Namely, each of said drive units 125 are arranged so that tables 22 (to be described later), of which two each are equipped as moving portions, are on the upper side.

On the other hand, two drive units 125 identical to those described above are fixed mutually in parallel on the lower side of moving table 122 so as to transverse both drive units 125 on bed 121. Furthermore, with respect to both drive units 125 attached to moving table 122, tables 22 (to be described later), of which two each are equipped as moving portions, are on the lower side said drive units 125, namely facing downward.

As is clear from FIGS. 2 and 4, corresponding tables 22 equipped on each drive unit 125, of which two each are provided on the upper side of bed 121 and the lower side of moving table 122 in the state in which they are back to back and above and below each other as described above, are coupled to each other. Although later described in detail, sliders are formed by this coupled body that is formed by coupling of these upper and lower tables 22.

A guiding device that two-dimensionally guides the above-mentioned moving table 122 with respect to bed 121, and a driving device that moves said moving table 122 by applying driving force to it, is composed by the total of four drive units 125, of which two each are provided above and below as described above. Furthermore, each of said drive units 125 consist of mutually adding a guiding unit that performs guiding action and a direct current linear motor for generating driving force. Continuing, the following provides a detailed description of the constitution of these drive units 125. However, since each drive unit 125 has the same constitution, an explanation is only provided for one representative drive unit, namely drive unit 125, which is, in this case, arranged on one side of bed 121 (the drive unit for which reference numeral 125 is underlined in the drawings). An explanation of the other drive units is omitted.

First, the following provides an explanation of the guide unit that is contained within drive unit 125 and guides the above-mentioned moving table 122.

Figure 5:
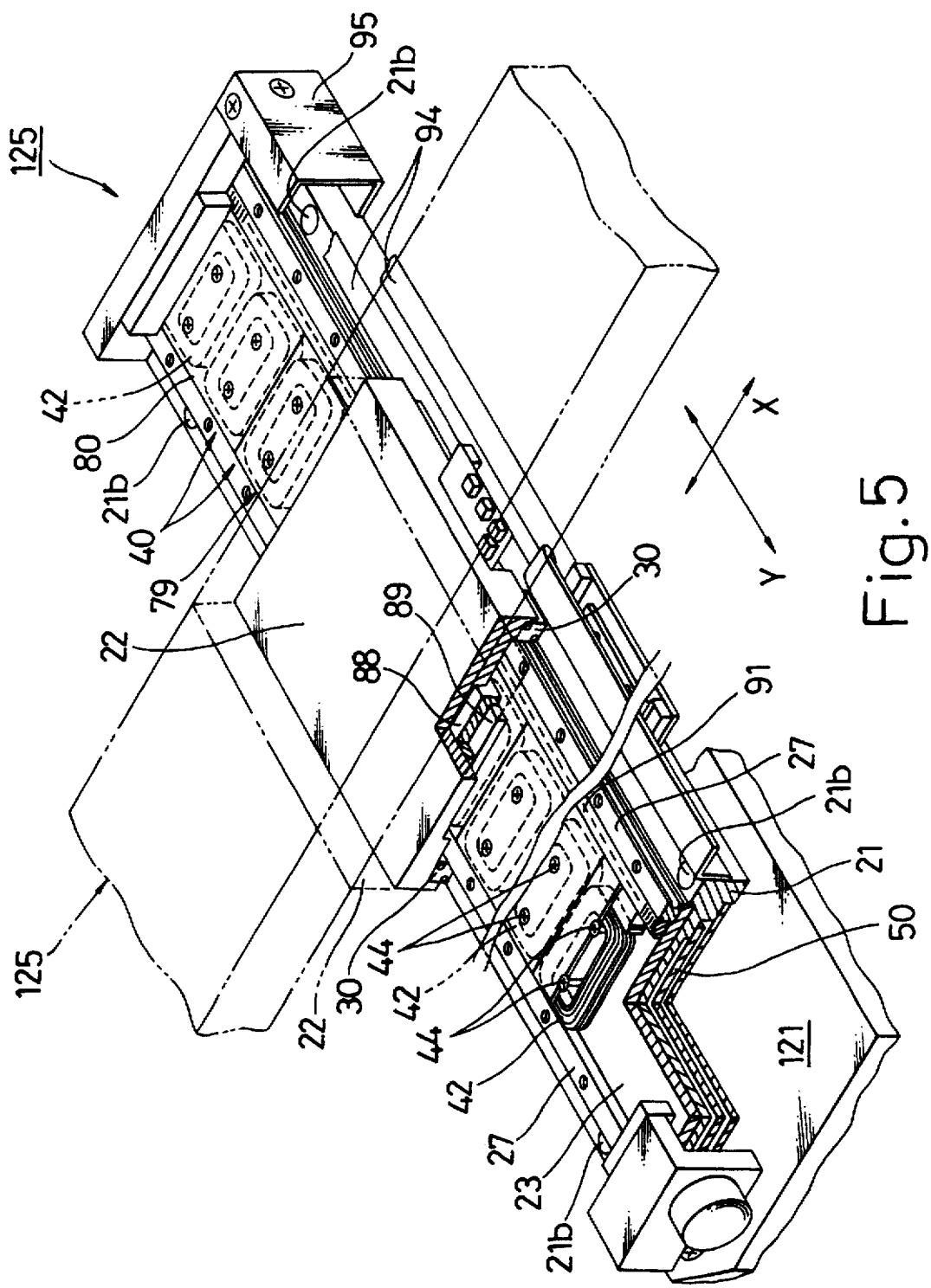
FIG. 5 is a perspective view, including a partial cross-section, showing the drive unit and its peripheral members equipped on the XY drive apparatus shown in FIGS. 2 through 4.
Figure 6:
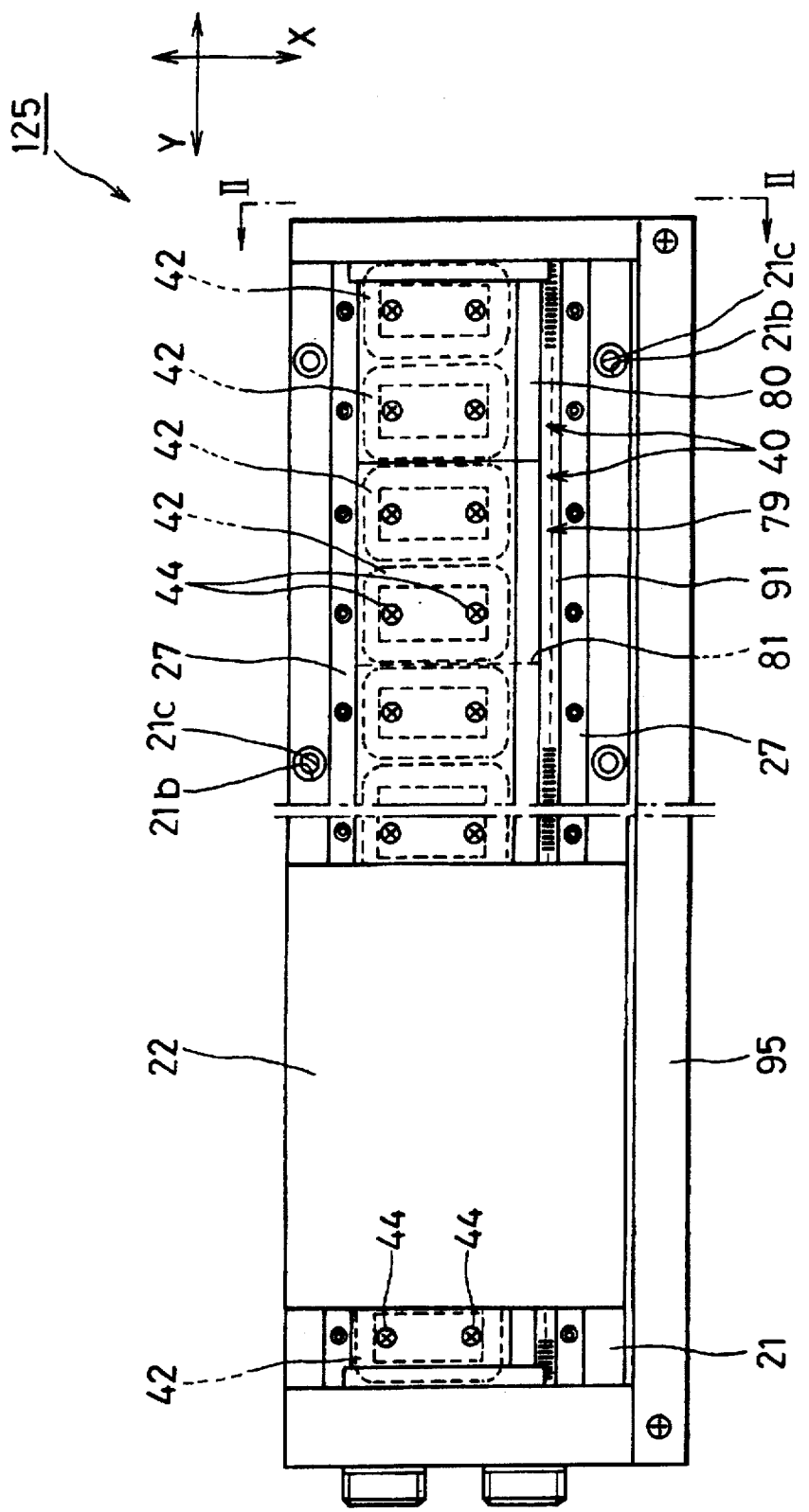
FIG. 6 is an overhead view of the drive unit shown in FIG. 5.
Figure 7:
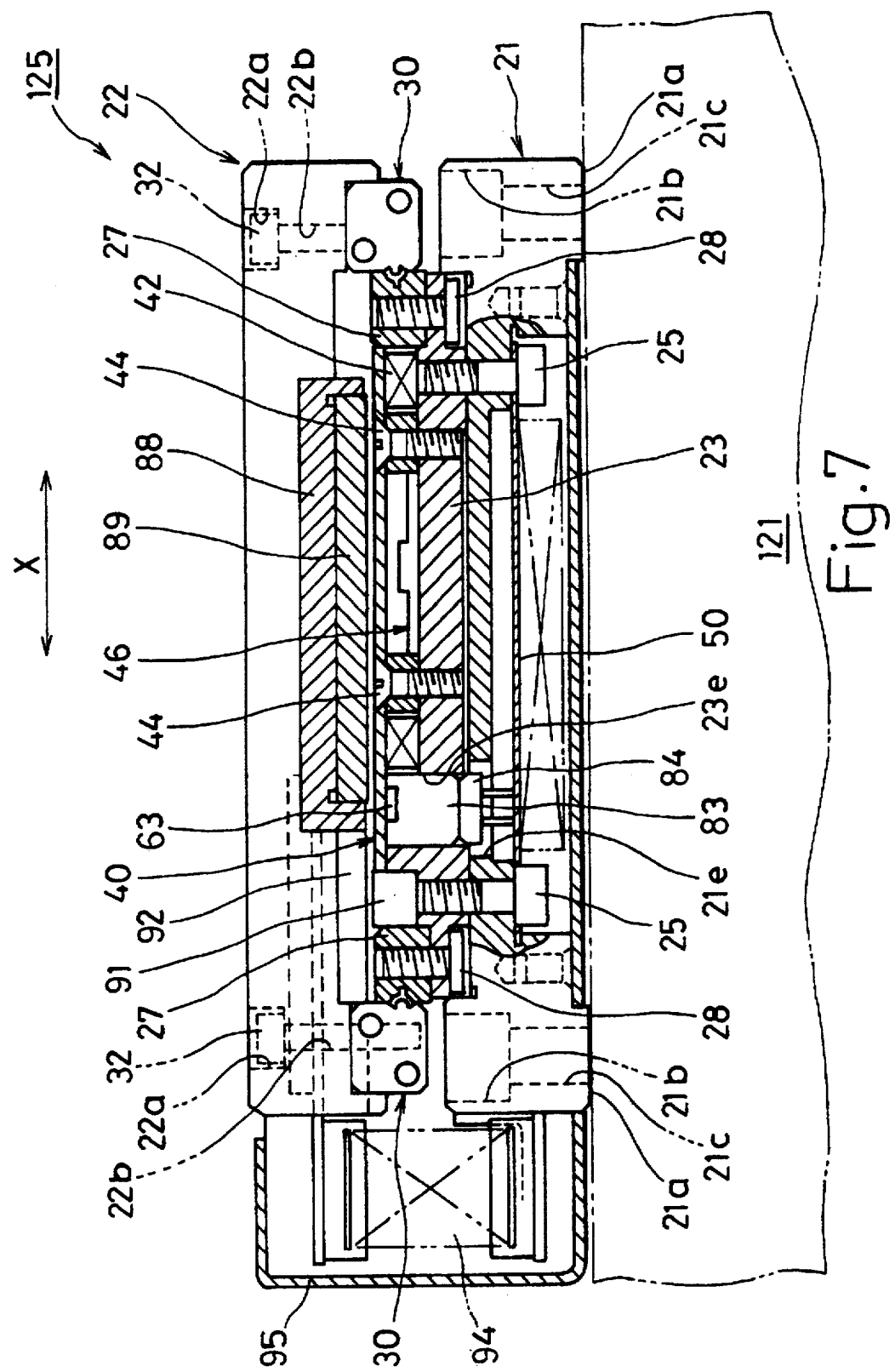
FIG. 7 is a side view, including a partial cross-section, showing the drive unit and its peripheral members as viewed along arrows II—II relating to FIG. 6.

As is shown in FIGS. 5 through 7, this guide unit has bed 21 formed roughly into the overall shape of, for example, a rectangle, and table 22 to move along the lengthwise direction of said bed 21. Furthermore, as is clear from FIGS. 2 and 4, although two tables 22 each are provided for one drive unit 125, since both said tables as well as each of the components installed on each of the tables are mutually composed in the same manner, starting in FIG. 5, only one table 22 is shown. Similarly, the explanation will only deal with one table 22. As shown in FIGS. 5 and 7, coil yoke 23, formed into roughly a rectangular shape and having nearly the same length as bed 21, is arranged on the upper surface of said bed 21, and is fastened to said bed 21 by a plurality of bolts (with hexagon sockets, see FIG. 7) 25.

Two track rails 27 are arranged on both sides of the upper surface of said coil yoke 23 along the lengthwise direction of said coil yoke 23, and are fastened to said coil yoke 23 by a plurality of flat head screws 28 (see FIG. 7).

Figure 8:
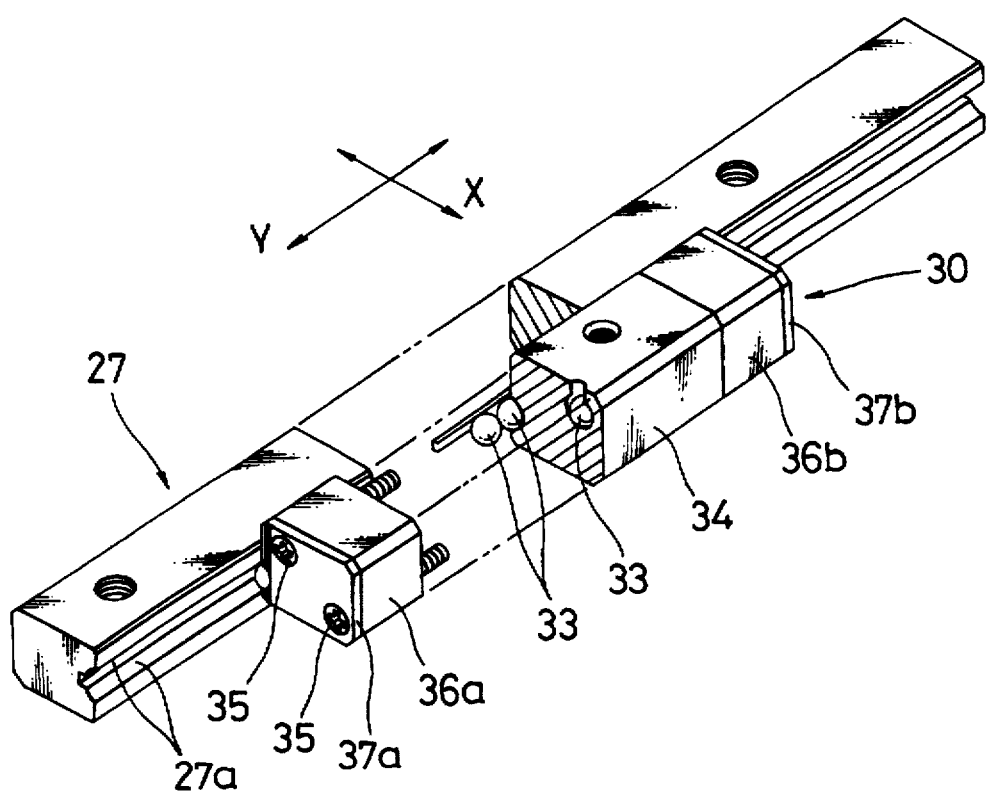
FIG. 8 is a perspective view, including a partial cross-section, of the track rail and slide member equipped on the drive unit shown in FIGS. 5 through 7.

As shown in FIG. 8, a track in the form of a single track groove 27a, having a roughly semi-circular shaped cross-section, is formed in the outside of the above-mentioned track rail 27. As is clear from FIGS. 5 and 7, slide member 30, able to freely perform relative motion with respect to said track rail 27, is arranged on the outside of said track rail 27, and is fastened to the lower surface of table 22 by, for example, a plurality of bolts (with hexagon sockets) 32 (shown in FIG. 7 only). Furthermore, as shown in FIG. 7, countersunk portions 22a and insertion holes 22b are formed in table 22 into which the head portions and threaded portions, respectively, of bolts 32 are inserted. Bolts 32 are embedded in these countersunk portions 22a and insertion holes 22b, and do not protrude from the upper surface of table 22.

A rolling element circulating path (not shown) is formed in the above-mentioned slide member 30, and rolling elements in the form of a large number of balls 33 are arranged and contained within said rolling element circulating path. These balls 33 bear the load between track rail 27 and slide member 30 by circulating while rolling over track groove 27a of track rail 27 accompanying movement of slide member 30 with respect to track rail 27.

As shown in FIG. 8, the above-mentioned slide member 30 has casing 34, a pair of end caps 36a and 36b coupled to both ends of said casing 34 by round head screws 35, and two seals 37a and 37b fastened to the outer surfaces of both of said end caps 36a and 36b. The above-mentioned rolling element circulating path is composed of a load bearing track groove and return path formed in casing 34 mutually in parallel and passing linearly through said casing 34, and a pair of roughly arc-shaped direction changing paths formed in both end caps 36a and 36b that connect both ends of said load bearing track groove and return path. Furthermore, said load bearing track groove opposes track groove 27a of track rail 27.

The guide unit of the constitution described above is fastened to a flat mounting surface formed on the above-mentioned bed 121 by a plurality of bolts (with hexagon sockets: not shown). Consequently, as shown in FIG. 7, bed 21 has flat mounting bottom surface 21a for anchoring said bed 21 to said mounting surface. As shown in FIGS. 5 through 7, countersunk portions 21b and insertion holes 21c are formed in both sides of bed 21 into which the head portions and threaded portions of the above-mentioned bolts for fastening said bed are respectively inserted. Said bolts are embedded in these countersunk portions 21b and insertion holes 21c, and do not protrude from the upper surface of bed 21.

Continuing, the following provides a detailed description of the primary and secondary sides of the direct current linear motor that is mutually combined with the guide unit having the constitution described above. Furthermore, said direct current linear motor is of a moving magnet type.

Figure 9:
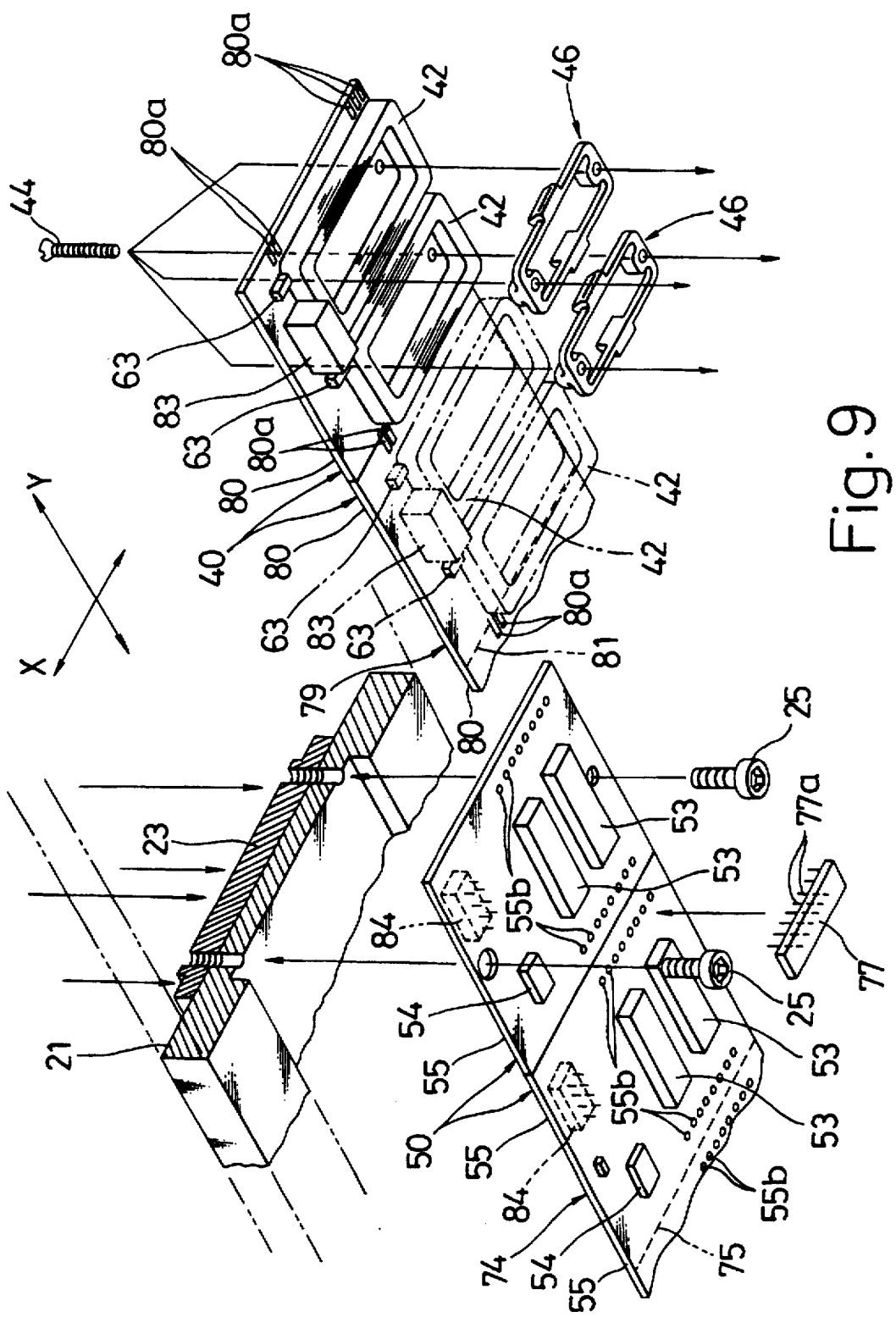
FIG. 9 is an exploded perspective view, including a partial cross-section, of the essential portion of a direct current linear motor contained in the drive unit shown in FIGS. 5 through 7.

To begin with, as shown in FIGS. 5 through 7 and 9, the primary side has the previously described coil yoke 23 installed on bed 21, coil substrate 40 arranged along the lengthwise direction of said coil yoke 23 on the upper surface of said coil yoke 23, and, for example, 32 armature coils 42 supported by being affixed in a row along the direction in which the above-mentioned table 22 is to move on the lower surface of said coil substrate 40, namely the side of coil yoke 23. Furthermore, each armature coil 42 is wound into roughly the shape of a rectangular loop. In addition, as shown in FIGS. 7 and 9, Hall effect elements 63 are provided corresponding to each armature coil 42 on coil substrate 40. These Hall effect elements 63 compose a drive circuit together with each electronic component and so forth provided on a circuit substrate to be described later. Said drive circuit is for supplying electricity to each of the above-mentioned armature coils 42. Each Hall effect element generates a signal corresponding to the amount of lines of magnetic force emitted by a field magnet when said field magnet equipped on the secondary side (to be described later) approaches. The supply of electricity to each of the above-mentioned armature coils 42 and its interruption can thus be controlled based on this signal.

Each of the above-mentioned armature coils 42 and coil substrate 40 are fastened together to coil yoke 23 with said coil substrate 40 on the outside by fastening members in the form of countersunk head screws 44, two each, for example, of which are inserted for each of said armature coils 42.

As shown in FIGS. 7 and 9, spacer assemblies 46 are juxtaposed between coil substrate 40, fastened by countersunk head screws 44, and coil yoke 23 into which said countersunk head screws 44 are screwed. These spacer assemblies 46 are provided so that deformation, such as warping and so forth, does not occur in coil substrate 40 caused by tightening of countersunk head screws 44, and are fit inside each armature coil 42.

Next, the following provides an explanation of circuit substrate 50 for performing supply of electricity and so forth to each of the above-mentioned armature coils 42.

As shown in Figs. 5, 7 and 9, circuit substrate 50 is arranged in parallel with coil substrate 40 on the lower surface of bed 21 on which said coil substrate 40 is installed on its upper surface with coil yoke 23 in between. Moreover, said circuit substrate 50 is fastened to said bed 21 by a plurality of bolts (with hexagon sockets) 25. Furthermore, these bolts 25 serve to fasten the above-mentioned coil yoke 23 to bed 21.

As shown in FIG. 9, the above-mentioned circuit substrate 50 is composed by joining together a plurality of separate portions 55, each provided with a drive circuit composed of electronic components 53, 54 and so forth. These separate portions 55 are provided corresponding to each unit of two armature coils each of the 32 armature coils 42 provided in a row. Thus, the number of these separate portions 55, in this case, is 16.

The drive circuit provided on each of the above-mentioned separate portions 55 contains one set of circuit portions supplying excitation current to one armature coil 42, or in other words, contains a circuit corresponding to two armature coils 42.

Continuing, the following provides a detailed description of the separated constitution of the above-mentioned circuit substrate 50 and coil substrate 40 arranged above it.

To begin with, the following provides an explanation of circuit substrate 50.

In the case of fabricating this circuit substrate 50, a base substrate 74, having a base length (a portion is shown in FIG. 9), is made available. This base substrate 74 is composed of, for example, 15 separate portions 55, explained based on FIG. 9, joined into a single unit. As was previously described, these separate portions 55 are provided with a drive circuit that performs supply of electricity and so forth to two armature coils 42 each grouped in the form of individual units. Furthermore, as shown in FIG. 9, marks in the form of broken lines 75 are printed on both the top and bottom surfaces of base substrate 74 (shown only on the bottom surface in the drawings) for distinguishing each separate portion 55.

Since the previously described circuit substrate 50 must link together 16 of the above-mentioned separate portions 55, said circuit substrate 50 is completed by severing one of the 15 separate portions 55 possessed by the above-mentioned base substrate 74 along the broken line 75 to separate, arranging this separated separate portion 55 in a row at one end of unseparated base substrate 74 as shown in FIG. 9, and mutually connecting their corresponding connection terminals.

Furthermore, in FIG. 9, connection between the above-mentioned separated separate portions 55 and base substrate 74 is performed by a single connection component 77 having terminals 77a fit into through holes 55b provided at the portions of both connection terminals. Furthermore, although connection between corresponding connection terminal portions may be performed using copper wire and so forth, by performing connection using this type of connection component 77, in addition to connection being able to be performed all at once, connections are reinforced due to the rigidity of said connection component 77. In addition, besides using components that simply act to make electrical connections, electronic components such as IC and so forth may also be used for connection component 77.

The following provides an explanation of coil substrate 40.

Although the overall coil substrate 40 is not shown, in the case of fabricating this coil substrate 40, a base substrate 79 of a length nearly equal to base substrate 74 for the above-mentioned circuit substrate 50 is made available as shown in FIG. 9. This base substrate 79 is composed by linking together 15 separate portions 80 into a single unit in the same manner as base substrate 74 for circuit substrate 50. As shown in the drawing, two armature coils 42 each are affixed, grouped together in units, on these 15 separate portions 80, thus making the total number of armature coils 42 arranged in a row on base substrate 79 to be 30. Furthermore, as shown in FIGS. 9 and 6, marks in the form of broken lines 81 are printed on the top surface of base substrate 79 to distinguish these separate portions 80. As shown in FIG. 9, circuit substrate 50 is formed by joining and connecting a single separate portion 80 separated from another base substrate not shown to one end of this unseparated base substrate 79. Furthermore, in FIG. 9, reference numeral 80a indicates connection terminals provided on each separate portion 80.

Furthermore, in the description thus far, although two armature coils 42 each and a drive circuit for driving said armature coils 42 are separated into units with respect to coil substrate 40 and circuit substrate 50, three or more armature coils and their drive circuit may also be separated into their respective units. In addition, although base substrate 74, which supports 30 armature coils 42, and base substrate 79, on which a plurality of drive circuits are arranged in a row corresponding to two of these armature coils 42 each, are made available during fabrication of the drive unit equipped with a total of 32 armature coils 42 in the present embodiment, it is only natural that the setting of the total length of these base substrates 74 and 79, namely the numbers of armature coils and drive circuits to be equipped on these, can be suitably changed.

In addition, although coil substrate 40 and circuit substrate 50 are composed by separating at least one of separate portions 55 and 80 provided on base substrates 74 and 79, and joining it to unseparated base substrates 74 and 79 in the present embodiment, in the case the operating stroke of the drive unit to be fabricated is shorter than the total length of base substrates 74 and 79, at least one of each of separate portions 55 and 80 provided on each of said base substrates 74 and 79 should be cut away as necessary.

As shown in FIGS. 7 and 9, coil substrate 40 and circuit substrate 50, which are arranged to be mutually separated by bed 21 and coil yoke 23, are connected by connecting a plurality of, in this case 16, of connection devices in the form of both corresponding male and female connectors 83 and 84 provided on mutually opposing sides of both said substrates. One each of these connectors 83 and 84 is arranged with respect to each separate portion 55 and 80 each provided with two armature coils 42 and their drive circuit grouped into a unit as previously described. As shown in FIG. 7, said connectors 83 and 84 are mutually connected through apertures 21e and 23e formed in bed 21 and coil yoke 23. Thus, since one each of connectors 83 and 84 is provided for each of separate portions 55 and 80 of coil substrate 40 and circuit substrate 50, when mutually assembling both said separate portions 55 and 80, the directions of both can be recognized both quickly and easily, thus facilitating assembly work. Furthermore, connection of corresponding separate portions 55 and 80 may be performed by lead wires and not by connectors as described above. In addition, with respect to the number of connectors, besides providing only one connector for each of separate portions 55 and 80 as mentioned above, two or more connectors may also be provided.

On the other hand, the secondary side of the direct current linear motor is composed in the manner described below.

Figure 10:
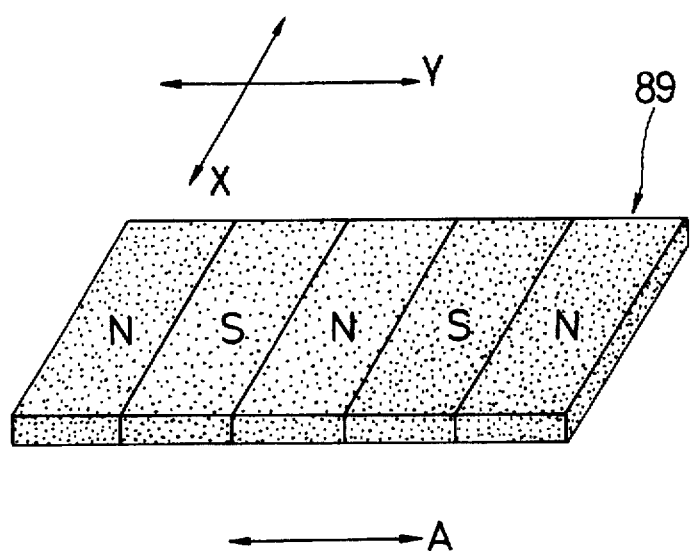
FIG. 10 is a perspective view of a field magnet that is a constituent member of the secondary side of the direct current linear motor contained in the drive unit shown in FIGS. 5 through 7.

As shown in FIGS. 5 and 7, said secondary side has magnet yoke 88, mounted on the lower side of table 22, and field magnet 89 anchored on the lower surface of said magnet yoke 88 to oppose each of the above-mentioned armature coils 42 of the primary side. As shown in FIG. 10, the overall shape of field magnet 89 is formed into roughly that of a rectangular plate, and a plurality of N and S magnetic poles, for example 5, are magnetized so as to be alternately arranged in a row along direction A in which relative movement is performed by the primary and secondary sides, namely the lengthwise direction of bed 21.

In said drive unit 125, a position detection device having the constitution described below is provided for detection of the relative positions of the above-mentioned bed 21 and table 22.

Namely, said position detection device is composed of linear magnetic scale 91 shown in FIGS. 5 through 7, and magnetic sensor portion 92 shown in FIG. 7. Said linear magnetic scale 91 extends in the direction of movement of the above-mentioned table 22, and together with being multi-polarly magnetized by N and S magnetic poles alternately magnetized at a precise pitch along its lengthwise direction, an origin signal magnetized portion is formed on one end. On magnetic sensor portion 92, together with providing a Hall effect element for origin detection, another two Hall effect elements for the A and B phases are arranged mutually shifted by ½ the above-mentioned pitch. As a result of employing said constitution, both A phase and B phase signals are obtained, thereby enabling detection of relative position and discrimination of direction of movement.

Furthermore, as shown in FIGS. 5 and 7, cables in the form of flexible substrates 94 for obtaining signals from the above-mentioned magnetic sensor portion 92, and cover 95, which covers said flexible substrates 94, are provided.

In drive unit 125 having the above-mentioned constitution, by supplying a prescribed excitation current to each of armature coils 42, thrust is produced based on Fleming's right hand rule between the primary and secondary sides. If bed 21 is taken to be the stationary side, then table 22, integrated into a single unit with the secondary side, is moved by this thrust. Moreover, the position of table 22 with respect to bed 21 is detected by the position detection device described above.

Drive unit 125 is composed in the manner described above.

However, as was previously described, two each of the above-mentioned drive units 125 are provided on the upper side of bed 121 and lower side of table 122, respectively, and are mutually transversing while positioned back-to-back above and below. Two each of tables 22, which are equipped on two each of drive units 125 above and below, are positioned between the mutually transversing portions of said upper and lower drive units, and upper and lower tables 22 are mutually coupled. The moving portions that are composed by coupling these upper and lower tables 22 act as sliders. Namely, as is clear from FIGS. 2 through 4, the moving portions in the form of said sliders are located at four locations. More specifically, each of said moving portions is composed of two tables 22 mutually coupled above and below, and a slide member 30 respectively attached to both of said tables 22.

However, a total of four of the above-mentioned drive units 125 are provided, two each positioned above and below. These four drive units 125 are equipped with a set of two parallel track rails 27 each. With respect to these track rails 27, track rails 27 provided on the lower side, namely on the upper surface of bed 121, and of which two each are equipped as a set on two drive units 125, are defined as, for example, first track rails, while the track rails 27 provided on the upper side, namely on the lower surface of moving table 122, and of which two each are equipped as a set on the other two drive units 125, are defined as second track rails. Conversely, the track rails 27 of the upper drive units 125 may also be defined as first track rails, and the track rails 27 on the lower drive units 125 may be defined as second track rails.

Furthermore, although each drive unit 125 is equipped with two track rails 27 as a set as described above in the present embodiment, a drive unit may be employed that is equipped with one or three or more track rails as a set. In addition, although a total of four drive units 125 are arranged in the manner of two each above and below in the present embodiment, three or more drive units each may also be provided above and below.

A guiding device is composed that two-dimensionally guides moving table 122 so as to move freely with respect to the stationary side in the form of bed 121 by the above-mentioned first track rails, second track rails and the above-mentioned four moving portions in the form of sliders arranged between the mutually transversing portions of said first track rails and said second track rails that are able to freely perform relative motion with respect said first and second track rails.

In addition, the direct current linear motor of the previously described constitution is equipped on each of the above-mentioned four drive units 125. Namely, a total of four direct current linear motors are provided, and are arranged to individually correspond to each set of the above-mentioned first and second track rails. A driving device is composed by these direct current linear motors that drive the above-mentioned moving table 122 so as to move two-dimensionally.

As described above, in the XY drive apparatus as claimed in the present invention, linear direct current motors, composed to have a flat constitution, are employed as driving devices that move moving table 122. Thus, the apparatus is thin that enables it to contribute to reduced size of the machine tool and so forth in which said XY drive apparatus is to be incorporated.

In addition, as a result of employing direct current linear motors, the operating speed of said direct current linear motors becomes the operating speed of the above-mentioned moving table 122, thus enabling work to be performed at an extremely high speed.

In addition, in said XY drive apparatus, a guiding device that two-dimensionally guides moving table 122 has first track rails consisting of a plurality of sets containing at least one track rail per set (two track rails per set in the case of the present embodiment) mounted mutually in parallel on either the above-mentioned bed 121 or moving table 122, second track rails consisting of a plurality of sets containing at least one track rail per set (two track rails per set in the case of the present embodiment) mounted mutually in parallel on the other of the above-mentioned bed 121 or moving table 122 and arranged so as to transverse said first track rails, and a plurality of moving portions in the form of sliders arranged at the mutually transversing portions of said first track rails and said second track rails that freely perform relative motion with respect to said first track rails and said second track rails (composed by coupling corresponding upper and lower tables 22). A plurality of the above-mentioned direct current linear motors are provided, and arranged individually corresponding to each set of the first and second track rails. According to said constitution, since the above-mentioned corresponding moving portions positioned on both sides of moving table 122 are driven by the synchronous operation of each direct current linear motor provided individually corresponding to each said moving portion, there is no occurrence of deviation in the mutual moving distance caused by sliding resistance and so forth produced between said moving portions and the track rails, thus preventing twisting of moving table 122 and enabling highly accurate positioning.

In addition, as is clear from FIG. 7, in the XY drive apparatus of as claimed in the present invention, the group of armature coils 42 equipped on the above-mentioned direct current linear motors is arranged so as to be inserted between the above-mentioned corresponding track rails 27. Namely, the dead space formed as a result of providing said track rails 27 is utilized in the form of space for installing the above-mentioned armature coils 42. As a result, the apparatus is made even thinner.

In addition, the following constitution is also employed in the present invention.

Namely, each set of the above-mentioned first track rails or second track rails, and the site that engages while being able to freely perform relative motion with respect to said track rails of the above-mentioned moving portions in the form of sliders (consisting of one table 22 and one slide member 30 installed on it) are integrated into a unit in the form of drive unit 125 together with the above-mentioned direct current linear motor. Consequently, this facilitates easier part management and assembly of the resulting XY drive apparatus.

Furthermore, although moving portions in the form of sliders are composed by coupling corresponding tables 22 above and below respectively equipped on drive units 125 arranged above and below in the present embodiment, each table 22 above and below and slide members 30 respectively installed on them may be integrated into a single unit overall.

In addition, although bed 121 is taken to be the stationary side and moving table 122 is taken to be the moving side in the present embodiment, conversely, bed 121 may be operated while taking moving table 122 to be the stationary side, or both may be taken to be moving, thus enabling relative motion to be performed by moving both together.

In addition, although the side of armature coils 42 is indicated to be the stationary side and the side of field magnet 89 indicates a direct current linear motor of the moving magnet type in the present embodiment, a direct current linear motor of the moving coil type can also be applied. In addition, although a direct current linear motor is indicated for the linear electromagnetic actuator in the present embodiment, it may also be composed with other types of motors, including a linear stepping motor or variable reactance type linear motor, and there are no limitations on the type of actuator used.

As has been explained above, in the XY drive apparatus according to the present invention, linear electromagnetic actuators composed to be flat are employed for the driving device that moves a relative moving member. Thus, the apparatus is thin, thereby offering the advantage of contributing to reduced size of the machine tool and so forth in which said XY drive apparatus is to be incorporated.

In addition, as a result of using linear electromagnetic actuators, the operating speed of said linear electromagnetic actuators becomes the operating speed of the above-mentioned relative moving members, thus offering the advantage of enabling performance of extremely high-speed work.

Moreover, in the XY drive apparatus according to the present invention, a guiding device that two-dimensionally guides relative moving members is composed to have first track rails consisting of a plurality of sets containing at least one track rail per set mounted mutually in parallel on one of either of the above-mentioned relative moving members, second track rails consisting of a plurality of sets containing at least one track rail per set mounted mutually in parallel on the other of either of the above-mentioned relative moving members so as to transverse said first track rails, and a plurality of sliders arranged at the mutually transversing portions of said first track rails and said second track rails that freely perform relative motion with respect to said first track rails and said second track rails. A plurality of the above-mentioned linear electromagnetic actuators are provided, and arranged individually corresponding to each set of the first and second track rails. According to said constitution, since the above-mentioned corresponding sliders positioned on both sides of the relative moving members are driven by the synchronous operation of each linear electromagnetic actuator provided individually corresponding to each said slider, there is no occurrence of deviation in the mutual moving distance caused by sliding resistance and so forth, thus preventing twisting of the relative moving members and enabling highly accurate positioning.

In addition, in the XY drive apparatus according to the present invention, in the case the above-mentioned linear electromagnetic actuators are direct current linear motors, the group of armature coils or field magnet equipped on each said direct current linear motor is arranged so as to be inserted between the above-mentioned corresponding first track rails or second track rails. Namely, the dead space formed as a result of providing said track rails is utilized in the form of space for installing the above-mentioned armature coils or field magnet. As a result, the apparatus is made even thinner.

In addition, the following constitution is also employed in the present invention.

Namely, each set of the above-mentioned first track rails or second track rails, and the site that engages while being able to freely perform relative motion with respect to said track rails of the above-mentioned sliders are integrated into a unit in the form of a drive unit together with the above-mentioned linear electromagnetic actuator. Consequently, the advantage is offered in which this facilitates easier part management and assembly of the resulting XY drive apparatus.

What is claimed is:

1. An XY drive apparatus including:
    a pair of relative moving members, each of which has a substantially plate-like shape and an opening at a center portion thereof;
    a guiding device which guides said relative moving members so as to freely and mutually perform two-dimensional relative motion; and
    a driving device which drives each of said relative moving members so as to freely perform relative motion,
    said guiding device comprising:
        two sets of first track rails, each set of said two sets being a pair of track rails parallel with each other, said two sets of first track rails being mutually fixed in parallel to a surface of one of said relative moving members on opposite sides of said opening;
        two sets of second track rails, each set of said two sets being a pair of track rails parallel with each other, said two sets of second track rails being perpendicular to said first track rails and being mutually fixed in parallel to a facing surface of the other one of said relative moving members on opposite sides of said opening; and
        a plurality of sliders, said sliders comprising two tables which ride on each of said track rails through a plurality of rolling elements, said sliders being provided at four intersecting portions of said first track rails and said second track rails, facing ones of said tables being combined integrally,
    said driving device comprising four drive units, each drive unit driving said set of track rails and two of said tables corresponding to said set of track rails so as to freely and mutually perform relative motion, one drive unit being provided for each set of track rails,
    each of said drive units being a linear direct current motor comprising a linear electromagnetic actuator which has a primary side including a group of armature coils, and a secondary side having a field magnet in which different magnetic poles are alternately arranged and magnetized along the direction of relative motion with respect to said primary side, and which are arranged so as to face said group of armature coils,
    one of said group of armature coils or said field magnet being arranged between each set of track rails, and the other of said group of armature coils or said field magnet being arranged on a facing surface of each table,
    whereby said XY drive apparatus is a linear electromagnetic actuator which enables said relative moving members to freely perform relative motion in a two-dimensional direction by synchronous operation of said drive units arranged on each of said relative moving members.

* * * * *